(12) United States Patent
Larsson et al.

(10) Patent No.: US 7,620,655 B2
(45) Date of Patent: Nov. 17, 2009

(54) METHOD, DEVICE AND COMPUTER PROGRAM PRODUCT FOR IDENTIFYING VISITORS OF WEBSITES

(75) Inventors: Magnus Larsson, Stockholm (SE);
Björn Sperling, Stockholm (SE)

(73) Assignee: Enecto AB, Stockholm (SE)

( * ) Notice: Subject to any disclaimer, the term of this patent is extended or adjusted under 35 U.S.C. 154(b) by 446 days.

(21) Appl. No.: 10/839,252

(22) Filed: May 6, 2004

(65) Prior Publication Data

US 2004/0225687 A1    Nov. 11, 2004

(51) Int. Cl.
*G06F 17/00* (2006.01)
(52) U.S. Cl. .................... 707/104.1; 707/101; 707/102; 707/103 R
(58) Field of Classification Search ................ 707/1–10, 707/100–104.1, 200–206
See application file for complete search history.

(56) References Cited

U.S. PATENT DOCUMENTS

2002/0031212 A1* 3/2002 O'Neil et al. .......... 379/211.02
2002/0062223 A1* 5/2002 Waugh ........................... 705/1
2002/0178169 A1* 11/2002 Nair et al. ................... 707/100
2003/0028433 A1  2/2003 Merriman et al.
2004/0073644 A1* 4/2004 Koch et al. .................. 709/223

FOREIGN PATENT DOCUMENTS

| WO | WO 00/67450 A1 | 11/2000 |
| WO | WO 01/25896 A1 | 2/2001 |
| WO | WO 02/03235 A1 | 1/2002 |

* cited by examiner

*Primary Examiner*—Isaac M Woo
(74) *Attorney, Agent, or Firm*—Birch, Stewart, Kolasch & Birch, LLP

(57) ABSTRACT

A method of identifying a visitor of a website in a wide area network is presented. An information signal is received which has been generated in response to the visitor visiting the website. The website visited is identified from the information signal. A network address of the visitor is determined. By using the network address, a database is searched to identify an organization with which the visitor is associated. A report is provided which includes information pertaining to the website visited and the organization with which the visitor is associated.

8 Claims, 3 Drawing Sheets

METHOD, DEVICE AND COMPUTER PROGRAM PRODUCT FOR IDENTIFYING VISITORS OF WEBSITES

TECHNICAL FIELD

The invention relates to a method for identifying visitors of websites by providing, for example, the company name of the visitor. The invention also relates to a device and a computer program product for identifying visitors of websites.

BACKGROUND OF INVENTION

Many or most companies have a website to present the companies and their products/services for customers and other interested parties. It is today possible to measure the traffic and the number of hits on websites. The identities of the visitors are often unknown to the website owners.

However, it is equally and sometimes more important to know who has visited the website and what pages the visitor visited. This is particularly important for website owners that merely display the available products/services on the website but often do not sell directly from the website. The identities of potential customers who have visited the website are therefore valuable information to be able to follow up and targeting marketing/sales efforts. Thus, there is a need for a reliable and efficient way of identifying the visitors of websites so that the website owner may better monitor/target the marketing efforts and effectively follow up with the visitors.

SUMMARY OF THE INVENTION

The present invention seeks to solve or at least reduce the problems discussed above. In more particular, an objective of the invention is to provide an efficient way of identifying visitors of websites.

Generally, these objectives are achieved by a method, device and computer program product according to the attached independent patent claims.

A first aspect of the invention is a method of identifying a visitor of a website in a wide area network, the method involving the steps of:

receiving an information signal generated in response to said visitor visiting said website;

identifying, from said information signal, the website visited;

determining a network address of said visitor;

searching, by using said network address, a database to identify an organization with which the visitor is associated; and providing a report, said report including information pertaining to the website visited and the organization with which the visitor is associated.

As used herein, "organization" includes, but is not limited to, commercial companies, etc., as well as non-commercial organization such as governmental, political, educational and institutional organizations.

The method may include the initial steps of:

allowing a user, that is associated with said website and desires to monitor visits to said website, to register for services;

generating a monitoring code; and associating the monitoring code with said website in a way so that the monitoring code will be included in the information signal which is generated in response to said visitor visiting said website.

Said step of identifying the website visited may be performed by detecting the monitoring code included in the information signal, and querying a lookup table that maps monitoring codes to websites.

For a website that includes a plurality of web pages, monitoring codes may be generated and associated with individual ones of said web pages, wherein said report may include information pertaining to individual web pages visited by said visitor.

The report may be provided in the form of an electronic or paper report listing to said user.

The network address determined for the visitor may be an IP address of a web client used by said visitor for visiting the website.

The method may include the steps of:

providing a first database;

storing, in said first database, website visit information including the network address of said visitor and any web pages visited by said visitor on said website;

providing a second database, said second database containing organization information about network addresses and associated organizations; and generating said report by collecting, in said second database, information pertaining to the organization associated with the network address of the visitor stored in the first database.

The website visit information in the first database may in addition include information about at least one of the following: time/date for the website visit, duration of the website visit, and another website/web page from which the visitor initiated the website visit.

The organization information in the second database may, in addition to network address, include information about at least one of the following: organization name, registration number, VAT number, postal address, street address, www address, email address, telephone number, telefax number, a number of employees, and Internet Service Provider.

A second aspect of the invention is a device for identifying a visitor of a website in a wide area network, the device comprising:

means for receiving an information signal generated in response to said visitor visiting said website;

means for identifying, from said information signal, the website visited;

means for determining a network address of said visitor;

means for searching, by using said network address, a database to identify an organization with which the visitor is associated; and means for providing a report, said report including information pertaining to the website visited and the organization with which the visitor is associated.

A third aspect of the invention is a computer program product comprising computer readable program code for carrying out the steps according to the first aspect.

The second and third aspects have generally the same features and advantages as the first aspect.

Other objectives, features and advantages of the present invention will appear from the following detailed disclosure, from the attached dependent claims as well as from the drawings.

BRIEF DESCRIPTION OF THE DRAWINGS

The present invention will now be described in more detail with reference to the appended drawings.

DETAILED DESCRIPTION

Figure 1:
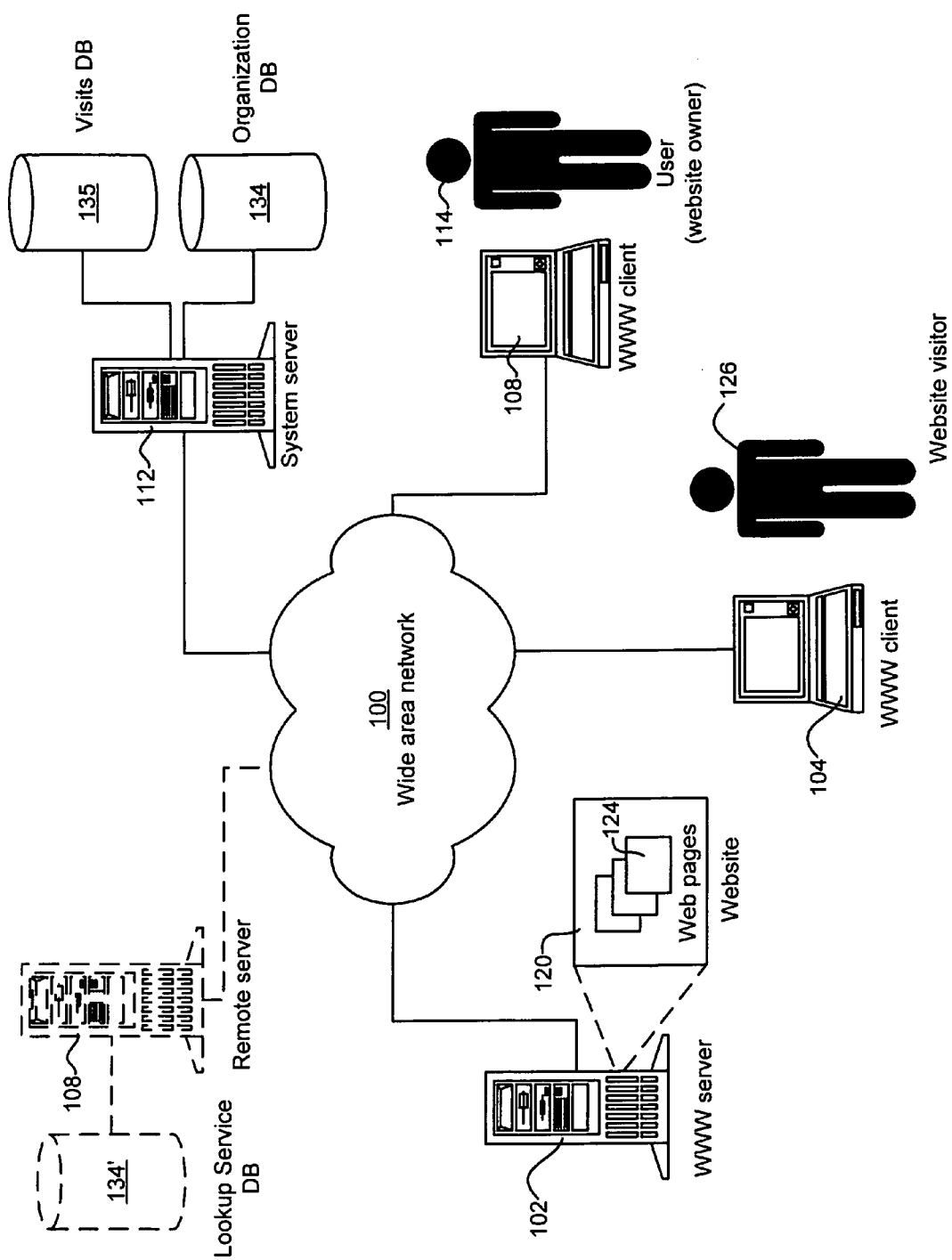
FIG. 1 is a schematic block diagram of hardware elements of a system in which an embodiment of the invention is implemented.
Figure 2:
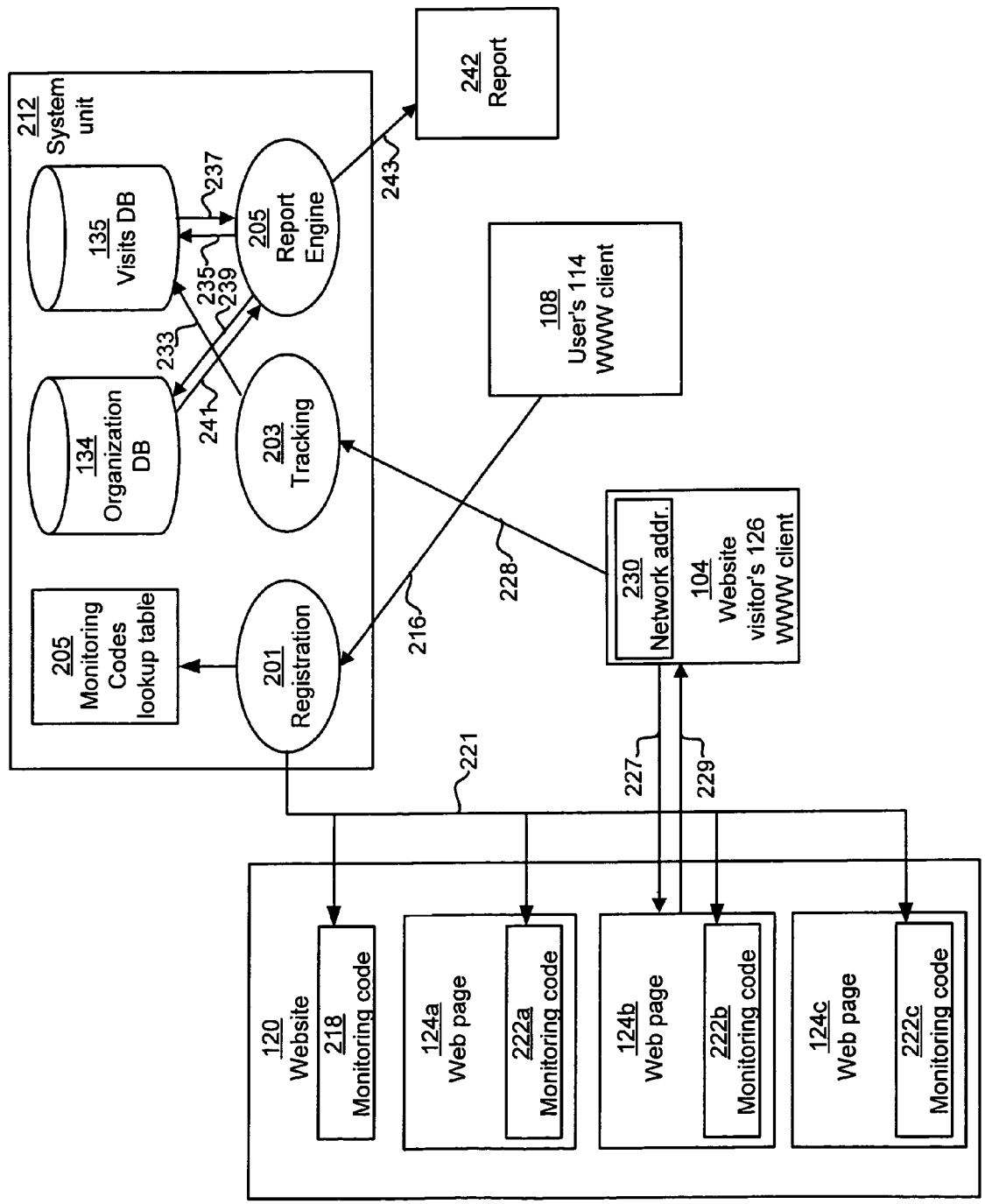
FIG. 2 is a schematic block diagram of software elements of a system in which an embodiment of the invention is implemented.
Figure 3:
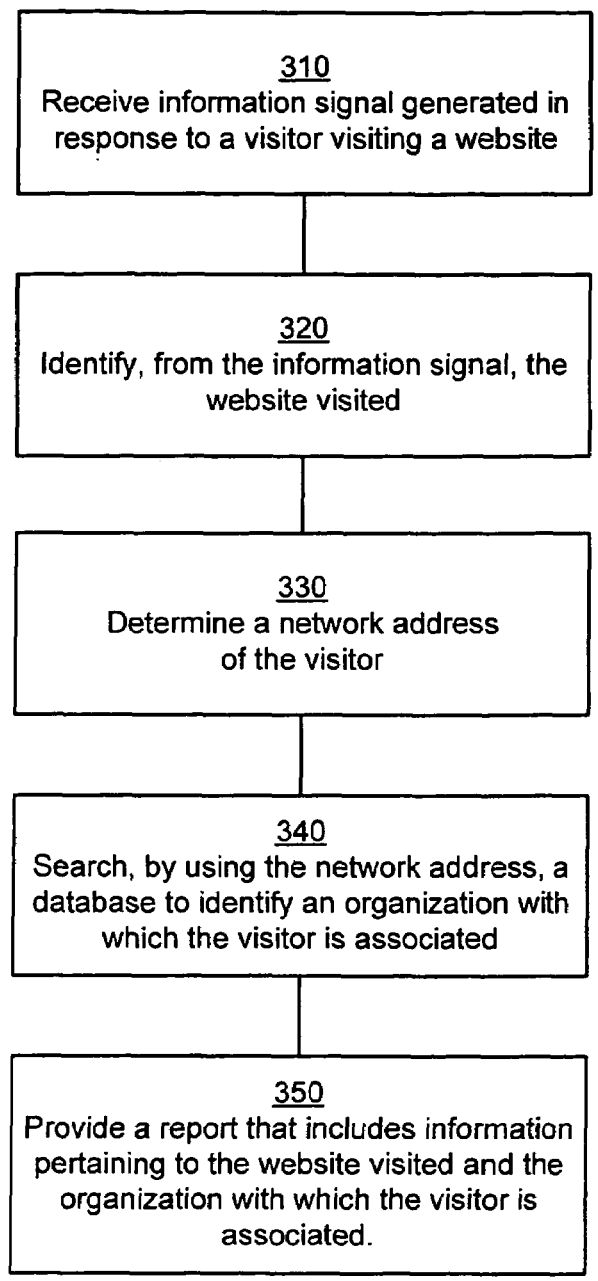
FIG. 3 is a schematic flowchart diagram of a method according to the invention.

FIGS. 1 and 2 disclose a system in which an embodiment of the invention is implemented, from a hardware and a software perspective, respectively. FIG. 3 illustrates a method according to the invention, involving a number of steps 310-350.

The system has a system server 112 connected to a wide area network 100, which may be the Internet or a part of it. The system server 112 implements a system unit 212 which includes a registration module 201, a tracking module 203 and a report engine 205. A user 114 which owns or is otherwise associated with a website 120 may register for website visits monitoring services by sending a registration signal 216 to the system unit 212. The website 120 contains a plurality of web pages 124*a-c*, each of which may relate to e.g. a respective product (commercial article or service) marketed by user 114 or a company that he represents. The registration module 201 handles a plurality of registration steps, such as asking user 114 for various data necessary for billing as well as data necessary to identify the website 120 and its web pages 124*a-c* (e.g. their http addresses). Upon proper registration, registration module 201 generates a monitoring code 218 that may be unique to the user 114 and the website 120. In addition or alternatively, the registration module 201 generates a plurality of respective monitoring codes 222*a-c* that are unique to each web page 124*a-c* of the website 120, thereby allowing the system unit 212 to keep track of the activity (i.e., the visits) at each web page and to provide a report 242 to the user 114, as will be explained in more detail later. The monitoring codes 222*a-c* may be sub-codes of the monitoring code 218, so that each web page 124 has its own unique monitoring code.

The generated codes 218, 222*a-c* may be included in an initiation signal 221 sent from the system unit 212 to the website 120. Upon receipt of the initiation signal 221, the website 120 may be adapted to modify its software program code (e.g. html or JavaScript code), automatically or by manual intervention, to include the monitoring codes and allow notification of subsequent website visits to the system unit 212, as will be described in more detail later. Advantageously, for later use when preparing the report, the registration module 201 may also store the generated monitoring codes in a lookup table 205 together with information about the website/web pages associated with the monitoring codes, and information about the user 114 associated with the website/web pages. The latter information may include service subscription information such as billing data and preferences data concerning contents, layout, periodicity and delivery media for the report 242.

A visitor 126 may visit a desired web page 124b by entering the http address thereof in a www browser executed by a www client computer 104, as is well known per se. Thus, www client 104 sends a contact signal 227 to the www server 102 embodying the website 120. In response, www server 102 will transmit a reply signal 229 containing the relevant data of the desired web page 124b to the www client 104.

In a typical case, the data transmitted in the reply signal 229 includes html and possibly JavaScript code that will be used by the www browser of www client.104 to present the desired web page 124*b* to the visitor 126. The monitoring code 222*b* is advantageously embedded in the transmitted data. In the disclosed embodiment, the data transmitted in the reply signal 229 from the www server 102 includes the following html/JavaScript code segment:

```
<!-- Tracking of monitoring codes -->
<script language="JavaScript">document.write('<img
src="http://www.enecto.com/track?cust_id=2&page_id=8a80859ffc062d8b00fc4b30df2c5f06
&ref='+escape(document.referrer) + '&tm=' + new Date( ).getTime( ) +'" height="1" width="1"
alt="">');</script><noscript><img
src="http://www.enecto.com/track?cust_id=2&page_id=8a80859ffc062d8b00fc4b30df2c5f06"
alt=""></noscript>
<!-- End Tracking of monitoring codes -->
``` where cust_id represents monitoring code 218 and thus identifies the visited website 120, page_id represents monitoring code 222*b* and thus identifies the visited web page 124*b* on website 120, and ref represents the network address of a referring web page on a website that visitor 126 was currently visiting when the contact signal 227 was generated—i.e., the web page that visitor 126 requested a jump from to visit web page 124*b* instead. The referring web page may for instance belong to an Internet search engine, where visitor 126 made a search for a particular product, the search engine returned from its search with a link to a matching web page, namely web page 124b, which contains information on the wanted product, and visitor 126 selected this link.

When the web page 124*b* is visited in this manner, the www browser of www client 104 will execute the code segment listed above, wherein an information signal 228 will be sent to the system unit 212 at address http://www.enecto.com/track as a request for a dummy file in the form of a 1×1 "empty" image. As is seen above, the parameters cust_id, page_id and ref are included in this request for the dummy file, together with the current date and time.

The tracking module 203 is adapted to detect aforesaid request and its parameters as transmitted in the information signal 228. In addition, the tracking module 203 detects the network address 230, such as the Internet Protocol (IP) address, of the visitor's 126 www client 104.

Particularly in embodiments which only use monitoring codes 222 on web page level but not any monitoring code 218 on website level, the tracking module 203 may use the lookup table 205 to determine to which website 120 a particular monitoring code 222/web page 124 belongs.

The tracking module 203 stores (233) a record for the visit, as notified by the information signal 228, in a visits database 135. Such a visit record may include information about the network address (IP address) of the visitor, date/time for the visit, the website visited, the web pages visited on the website, and the referring web site from which the visit originated—i.e., essentially the parameters of the information signal 228 in combination with the detected network address of the visitor. Alternatively, one record may be created and stored for each web page visited.

In order to prepare a report 242, the system unit 212 needs to identify an organization with which the visitor 126 is associated. Thus, in the disclosed embodiment, when the report engine 205 is to produce (243) a report 242 on behalf of the user 114, it will enquire (235) the visits database 135 for all visit records that pertain to visits to the particular website 120 which the user 114 owns or is otherwise associated with. Then, for each visit record in the response 237 from the visits database 135, the report engine 205 will enquire (239) an organization database 134 for information about the organization which has the network (IP) address given in the visit record. The organization database 134 responds (241) with the requested organization information. In the disclosed embodiment, a record in the organization database 134 includes network (IP) address, organization name, organization or VAT number, DUNS (Dun & Bradstreet) number, postal address, street address, www address, telephone number, telefax number, the number of employees, and Internet Service Provider (ISP). Of course, in other embodiments, the organization database 134 need not include all of these record fields, and it may on the other hand include other information not specifically referred to herein.

The organization database 134 may be proprietary of the service provider (i.e., the owner or manager of the system server 112, system unit 212 and its visits database 135), or it may be a database owned or managed by others. In the first case, the organization database 134 is advantageously (but not necessarily) internal or local to the system server 112, whereas in the second case, it is advantageously (but not necessarily) external to or remote from the system server 112 (such as an organization lookup service database 134' provided by a remote server 108 in FIG. 1). If the organization database 134 is internal or local to the system server 112, it may be integrated with the visits database 135 to form a single database which serves both purposes.

In another embodiment, identification of the organization with which the visitor 126 is associated may be done directly upon reception of the information signal 228. In this case, the organization information referred to above may be stored in the visit record in the visits database 135.

The report 242 prepared by the report engine 205 will list all of the information retrieved from the visits database 135 and the organization database 134, or a subset thereof, depending on the preferences of the user 114. The report will however at least contain enough information to clearly identify to the user 114 which organizations that have visited the website 120. In one embodiment, the report 242 includes organization (company) name, country of residence, city of residence, and date and time for the visit, but the alternatives are of course numerous. The report 242 may be delivered to the user 114 in the way he prefers, for instance as a paper listing sent by postal mail, courier or telefax, as an electronic listing sent by electronic mail or delivered on a record medium such as a magnetic or optical disk, or in the form of a www interface that allows online access to the report 242 by connecting to the system server 112 from e.g. the www client 108.

It may be possible for the system unit 212 to filter and adapt the information received from the organization database 134. For example, if the name of a company is no longer used, the system unit 212 may upgrade or correct such information (for instance by referring to the remote organization lookup service database 134') before it is presented in the report 242.

In another embodiment, the information signal 228 may be generated and transmitted by the website 120, i.e. at the www server side rather than at the www client side. In this embodiment, the information signal 228 may be triggered either directly when a visit to the website 120 causes the web server 102 to access the website's monitoring code 218, or when an individual web page 124a-c is visited and the web server 102 accesses its monitoring code 222a-c. The information signal 228 may include, among other things, an IP address that has been derived from the contact signal 227 of the visitor 126 and which web pages the visitor 126 visited. The IP address may be associated with the Internet Service Provider or the domain name of the visitor 126 when the visitor's own domain name has a fixed IP address that provides access to the Internet. The information signal 228 may also contain information about the duration of each visit and other such specific information.

It may not be necessary to assign a unique monitoring code to each product page. By enhancing the communication between the website 120 and the system unit 212, it may be possible for the website 20 to keep track of which product pages have been visited by the visitor 126 and include this information in the information signal 228 sent to the system unit 212. For example, the system unit 12 may assign a unique customer identification that could be used to keep track of all the visits of the product pages the visitor has made. It may be cumbersome to assign a unique monitoring code when the website has thousands of product pages.

In its different embodiments, the invention is beneficial in that it will allow sales and marketing departments of a company to follow up on new customers, potential customers or current customers that have visited the company's website. This information may be used to find out who to sell to (new customer prospects), who to allocate more resources to (making sales more efficient), or how to increase sales to current customers. Furthermore, sales people returning from customer visits can see if the potential customer has visited the website. A company that refers to its website when advertising can quickly see the effect of the advert and follow it up in sales work.

The invention may also provide a tool for identifying competitors and catch their activities at the company's website. For instance, a strong interest from another party in pricelist information on the website may indicate a potential competitor.

Furthermore, the invention may also be used to recognize if media such as television or newspapers takes interest in any particular piece of information on the website. This may for instance indicate an upcoming report or article.

Particular advantages of the invention are simplicity of use (no extensive software installations are required), usability, flexibility (reports may be provided in any format and on any media), and continuity (a website may be monitored 24 hours a day, 7 days a week).

In yet another embodiment, a method of identifying a visitor of a website involves:

a system unit being associated with a website;

a visitor visiting the website;

the website sending back an information signal to the system unit;

the system unit receiving the information signal;

the system unit sending a request signal including an IP number of the visitor to a database;

the database identifying a company name associated with the IP number and sending back a response signal to the system unit; and the system unit producing a report listing that lists the company name.

The method may further comprise the monitoring code triggering the information signal sent back to the system unit.

The method may further comprise the user sending a registration signal to the system unit to trigger the development of a monitoring code associated with the website.

The method may further comprise the system unit sending an initiation signal to a code unit to include the monitoring code in the website.

The method may further comprise the website retrieving the IP number from a contact signal of the visitor.

The method may further comprise including the IP number in the information signal sent to the system unit.

The method may further comprise including the company name in the response signal.

The method may further comprise including a geographical location of the visitor in the response signal.

The method may further comprise listing the geographical location and the company name in the report listing.

The method may further comprise listing each product page visited by the visitor.

While the present invention has been described in accordance with some embodiments, it is to be understood that various substitutions and alterations may be made thereto without departing from the spirit and scope of the invention, as defined by the appended claims.

What we claim is:

1. A method of providing visitor information of visitors of websites in a wide area network, each website of said websites having been associated with a unique monitoring code identifying each of said websites, the method comprising:

providing a first database;

providing a second database, said second database containing organization information about network addresses and associated organizations;

receiving, from a visitor of a website, an information signal comprising said monitoring code of the visited website, the monitoring code having been provided to the visitor by the website visited;

identifying the visited website from said information signal;

determining a network address of said visitor;

storing, in said first database, website visit information including the network address of said visitor and any web pages visited by said visitor on said website;

searching, by using said network address, said second database to identify an organization with which the visitor is associated;

generating a report by collecting, in said second database, information pertaining to the organization associated with the network address of the visitor stored in the first database; and providing a report.

2. A method as defined in claim 1, wherein the website visit information in said first database in addition includes information about at least one of the following: time/date for the website visit, duration of the website visit, and another website/web page from which the visitor initiated the website visit.

3. A method as defined in claim 1, wherein the organization information in said second database in addition to network address includes information about at least one of the following: organization name, registration number, VAT number, postal address, street address, www address, email address, telephone number, telefax number, a number of employees, and Internet Service Provider.

4. A computer-readable medium, storing a set of instructions, executed by a processor, for performing the method as claimed in claim 1.

5. A device for providing visitor information of websites in a wide area network, the device comprising:

a registration module for generating unique monitoring codes, the registration module being arranged to provide the unique monitoring codes to websites, each unique monitoring code being associated with one website for identification;

a tracking module for receiving and detecting an information signal from a visitor of a website, the information signal comprising a network address of the visitor and a unique monitoring code associated with the website, the tracking module being arranged to identify the visited website by detecting the unique monitoring code and the network address of the visitor, a first database for storing website visit information including said network address of said visitor and any web pages visited by said visitor on said website;

a second database containing organization information about network addresses and associated organizations; and a report engine for generating a report by collecting, in said second database, information pertaining to the organization associated with the network address of the visitor stored in the first database, and for providing a report to an address associated with the website, said report including information pertaining to the website and the organization with which the visitor is associated.

6. A device as defined in claim 5, wherein identifying the website visited further includes detecting the monitoring code included in the information signal, and querying a lookup table that maps monitoring codes to websites.

7. A device as defined in claim 5, wherein said report is provided in the form of an electronic or paper report listing to a user desiring to monitor visits to the website.

8. A device as defined in claim 5, wherein the network address determined for said visitor is an IP address of a web client used by said visitor for visiting the website.

* * * * *